Nov. 24, 1931.   F. N. KELSEY   1,833,218
SIGNAL VALVE
Filed Nov. 7, 1927
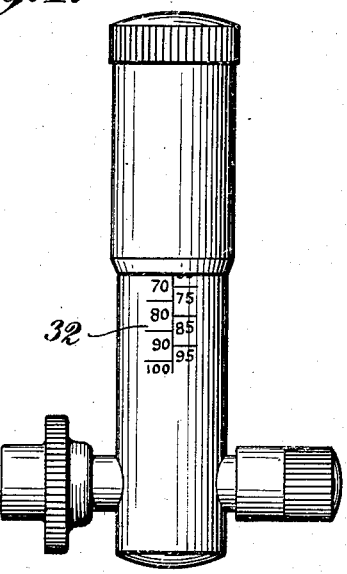
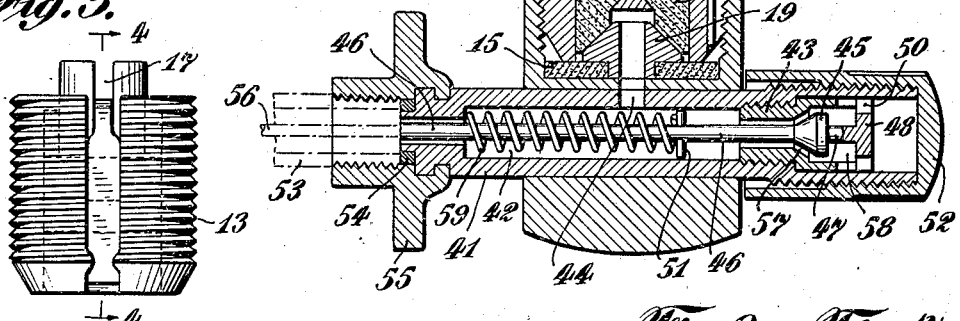
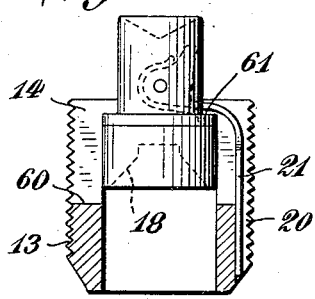
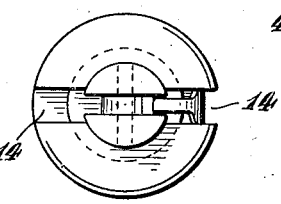
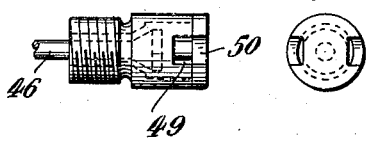
INVENTOR
Frank N. Kelsey
BY
ATTORNEY Patented Nov. 24, 1931

1,833,218

UNITED STATES PATENT OFFICE

FRANK N. KELSEY, OF NEW HAVEN, CONNECTICUT, ASSIGNOR OF ONE-HALF TO PAUL C. SWOLE, OF CLINTON, CONNECTICUT

SIGNAL VALVE

Application filed November 7, 1927. Serial No. 231,631.

This invention relates to a signal valve of a type designed to be attached to the valve head of a motor vehicle tire or the like, that will sound an alarm when the air in the tire exceeds a predetermined pressure.

It is the object of this invention, among other things, to provide in a device of this character simple and efficient means for reducing the air pressure at the point of intake, to provide means to relieve the release valve from the impact of the air that passes the reducing head at each stroke of the air pump, to produce a leak valve that will be both sensitive and active and will provide for a quick passage of air in full volume instead of a gradual, slow passage of air therethrough, and in these and other ways produce a signal valve which will combine simplicity, compactness, economy in construction, and efficiency in operation.

The improvements in the details and arrangement of parts will be apparent from an inspection of the accompanying drawings, in connection with the description hereinafter contained, wherein a preferred embodiment of the invention is disclosed for the purpose of imparting and understanding of the same.

In the drawings:—

Figure 1 is an elevation of my improved device complete;

Figure 2 is an enlarged longitudinal sectional elevation thereof;

Figure 3 is an enlarged elevation of the valve plug and valve;

Figure 4 is another elevation thereof, the parts in section being taken generally upon line 4—4 of Figure 3;

Figure 5 is a plan view of the valve plug and valve;

Figure 6 is a side elevation of the reducing head, bushing and adjacent parts; and Figure 7 is an end view thereof.

Referring now to the drawings, wherein like numerals of reference designate like parts in the several figures: 10 is the valve body having a chamber 11 therein, within which is threaded the valve plug 13 having two oppositely disposed, open-ended slots 14 through the walls thereof. These slots, in addition to the use hereinafter described, provide a convenient means for threading the plug 13 into the threaded walls of the chamber 11. The lower end of this plug may be seated against a washer 15 if desired.

Slidably mounted within the bore of the plug 13 is the release valve 16 that is secured to the end of a valve stem 62 having a slot 17 in one end thereof. This valve 16 is made of resilient material with an inverted conical seat 18, which in its down position is seated against a conical valve seat 19 connected with the washer 15. This valve seat 19 is preferably made of material harder than that of the valve 16 so that the pressure upon the valve 16 causes the same to be projected outwardly, thus insuring an air tight seat.

Fixed in the axial recess 20 in the plug 13 is a stop spring 21 having an inwardly turned stop finger 22 at its upper end which projects into the slot 17.

Mounted in the slot 17 upon the pintle 23 is a trigger 24, which is held in its outer position by a spring 25, which is secured to the valve stem 62 or in any convenient manner.

Threaded within the body 10 is a spring cylinder 26 having an opening 27 through the head thereof, between which and a shoulder upon the plug 28 is a spring 29. Secured to the head of the spring cylinder is a sleeve 30, the inside diameter of which is substantially the same as the outside diameter of the upper portion of the valve body 10, and the lower end 31 of which, when in register with the graduations 32 upon the exterior of the valve body 10 indicates the maximum pressure desired in the tube, this being the pressure at which the air will escape from the device and sound an alarm.

The sleeve 30 projects above the end of the spring cylinder 26 and terminates in the knurled head 33, so as to provide convenient means for manual rotation. Within this sleeve, near the end thereof, is a plate 34 having an opening 35 therein coincident with the opening 27 but of smaller diameter. Closing the outer end of the sleeve is an inverted cup 36 having an opening 37 through the head thereof. The arrangement of the inverted cup 36 and plate 34 is such that there is a chamber 38 therebetween.

The head of the spring plug 28 is provided with a conical face 39, which enters a corresponding conical recess in the end of the plug 13, thus centering these plugs in relation to each other.

At the lower end of the valve body 10 is an auxiliary valve body 41 having an air port 42 therethrough and threadably secured therein is a bushing 43. This auxiliary valve body is shown herein as being permanently secured to the valve body 10, but it may be made integral therewith if desired.

A port 44 connects the air port 42 with the chamber 11 and passes through the walls of the valve body 41, valve body 10 and washer 15.

The numeral 45 designates a reducing head which has a stem 46 upon one side thereof, another stem 47 upon the opposite side thereof, which terminates in the cap 48.

The end of the bushing 43 is provided with a plurality of notches 49 which perform the double function of admitting air into the chamber of the bushing and providing means for attachment of a wrench to rotate the bushing.

In the cap 48 are the oppositely disposed notches 50, which also serve substantially the same double function as the notches 49. When a wrench is applied to withdraw the bushing 43, the notches 49 and 50 are brought into register with each other to facilitate the positioning of the wrench.

The stem 46 is preferably provided with a guide pin 51 that will support and maintain the stem substantially concentric with the port 42. It also forms an abutment for the spring 59. Other convenient means may be provided and utilized to perform the function of this guide pin without impairing the operation of the parts.

The engagement of the underside of the cap 48 with the end of the bushing 43 limits the movement of the reducing head 45 in one direction, at which time there is an open space between the exterior of the conical portion of the reducing head and the conical bore in the bushing 43.

When not in use the end of the auxiliary valve body 41 is protected by a cap 52 threaded thereon.

The numerals 53 designate the valve head connected with the tire, which abuts at its inner end against the washer 54. My device is connected to the valve head by the nut 55 that is rotatably mounted upon the auxiliary valve body 41. When so assembled the end of the stem 46 forms an extension of the valve stem 56 within the valve head 53.

The cross sectional area of the open space between the conical portion of the reducing head 45 and the conical bore 57 is substantially the same as the area of the portion of the valve within the valve head 53.

As my device is being threaded onto the tire valve head, the stem 46 and reducing head 45 connected therewith float within the auxiliary valve body 41 and the reducing head is moved away from the conical bore 57. There is no pressure upon the tire valve stem 56 at this time, hence no air escapes from the tire during the attachment or detachment of my device, thereby preventing an unnecessary air leakage.

After the device has been applied to the valve head the cap 52 is removed and the tube from the air pump connected with the end of the auxiliary valve body 41. As the air therefrom engages the cap 48 it moves the same inwardly until the underside thereof engages the outer end of the bushing 43. There is now an open space surrounding the conical portion of the reducing head 45, and the inwardly moving valve stem 56 has opened the tire valve. The blast of air, whether from a hand or power operated pump, that enters the chamber 58 is usually greater in volume than can be accommodated by the valve in the valve head 53. This incoming air is, therefore, reduced in volume before it passes the reducing head. As the air that engages the outer end of the cap 48 first moves the same and then holds it against the end of the bushing 43, it thereafter only permits such volume of air to pass through the notches 50 as can properly be taken care of by the valve in the valve head 53. When the air is admitted from a power pump, the air pressure against the cap 48 is constant, while, if the air is admitted from a hand pump, the pressure is inconstant and the reducing head floats backward and forward according to the pressure thereagainst. As the chuck of a power pump is applied, the valve stem in the chuck engages the cap 48 and holds it in the position substantially as shown in Figure 2, and also holds open the valve in the chuck.

The opening around the cone of the reducing head 45 being substantial, the admitted air is taken into the inner tube through the valve stem 56 without disturbing the valve 16. If, however, this pressure is increased, say from twenty-five to seventy or eighty pounds, the coil spring 59 is compressed considerably more and the reducing head 45 moves to the position shown in Figure 2, that is, its closed position. Thus, less pressure is admitted into the air port 42 because the cap 48 is seated. This reduces the inlet area, only permitting sufficient air to pass into the air port 42 that can be admitted into the tire. When the full blast of the air pressure is admitted into the air port 42 it will go through the port 44 and lift the valve 16 off its seat.

As illustrated in Figure 2, the area of the valve stem 56 for admission of air into the tire is substantially the same as the area of the opening surrounding the cone of the reducing head 45 and the area of the port 44. When the device is attached to a high pressure pump, the end of the cap 48 contacts with the end of the bushing 43 and the end of the stem 46 is moved to the position shown in Figure 2, at which time the area around the reducing head 45 will only permit sufficient air to pass thereby that will be readily received by the tire valve 56. This position is constant under such high pressure connection.

In the mechanisms heretofore made the release valve has been moved off its seat by the incoming air and any excess air allowed to leak out slowly. This is objectionable, because the uncovering of the leak area is too gradual, hence too much air goes into the inner tube. In brief, the release valves of the type referred to are not sufficiently active, being too sluggish in their action. While the leak area gradually increases in area the air is still entering the inner tube. In my device I have overcome these and other objections in the type of mechanism herein disclosed by providing a structure wherein the valve moves gradually against a yielding pressure until the pressure arrives at a predetermined pressure, at which time the release valve is at once opened to its fullest extent, thus uncovering the maximum leak area, through which the excess pressure escapes at once, and not through a progressively increasing area as above described. When the pressure arrives at a predetermined point, say twenty-five, forty, fifty, or any other predetermined number of pounds determined by the spring 29, pressure against the valve 16 is sufficient to move it until the end of the trigger 24 engages the stop finger 22 on the spring 21. The lower edge of the valve 16 is now just below the bottom edges 60 of the slot 17 and the valve is still closed and no air will escape. When the pressure exceeds this predetermined pressure, the trigger is forced beyond the stop finger 22, which yields for the purpose, and continues its movement until the shoulder 61 contacts with the lip 40, as shown in Figure 4. At this time the release valve is fully opened and the air escapes through the uncovered portions of the slot 17 and through the openings 27 and 37 and does not enter the inner tube. The arrangement of the plate 34 and the relative sizes of the openings 27, 35 and 37 are such that an audible whistling sound is produced, thus announcing that the air pressure has exceeded that indicated by the registered graduations.

When the admission of air through the valve bushing 43 is discontinued, the spring 29 returns the valve 16 onto its seat, the trigger 24 rocking upon its pivot 23 passes by the trip finger 22 upon the spring 21, which latter yields for the purpose. This trigger may be made integral or separate and fastened against relative movement, in which case the spring 21 yields a greater distance than when the trigger yields. Also the spring 21 projects into one of the slots 17 and thereby holds the release valve against rotation. Thus it will be seen that the operation of the valve is entirely automatic.

There are minor changes and alterations that may be made within my invention, aside from those herein suggested, and I would therefore have it understood that I do not limit myself to the exact construction herein shown and described, but claim all that falls fairly within the spirit and scope of the appended claims.

Having described my invention, what I claim as new and desire to secure by Letters Patent is:—

1. In mechanism of the character described; a valve body having a chamber therein; a conical valve seat within the chamber; a plug within the chamber; a valve with an inverted conical face movably mounted within the plug; spring means for holding the valve upon the conical valve seat, whereby pressure applied thereto in one direction will expand the valve against the wall of the chamber in which it moves; and supplemental spring means for limiting the movement of the valve in one direction.

2. In a mechanism of the character described; a valve plug having an axial bore, a slot through one wall thereof opening into said bore; a valve movably mounted within the bore of the plug, having a slot therein; and a yielding member connected with the plug that projects through the slot in the valve plug and into the slot in the valve thereby to automatically limit the movement of the valve within the plug when the same is actuated by less than a predetermined pressure.

3. In a mechanism of the character described; a valve plug having a slot through one wall thereof; a valve movably mounted within the plug, having a slot therein; a yielding member connected with the plug and projecting into the slot in the valve to limit the movement of the valve within the plug when the same is actuated by less than a predetermined pressure; and a trigger yieldingly connected with the valve and during its movement engaging said yielding member.

4. In a mechanism of the character described; a valve plug having an axial bore, a radial slot in one wall thereof opening into said bore and another slot in the exterior wall thereof; a valve movably mounted within the bore of the plug having an opening therein; and a flexible member fixed within the last mentioned of said slots in the plug, having a portion thereon that projects through the first mentioned of said slots in the plug and into the opening of the valve, thereby to automatically limit the movement of the valve within the plug when the same is actuated by less than a predetermined pressure.

5. In a mechanism of the character described; a valve plug having a radial slot in one wall thereof and another slot in the exterior wall thereof; a valve movably mounted within the plug having an opening therein; a flexible member fixed within one of the slots in the plug, a portion of which projects into an opening in the valve, and thereby holds the valve against relative rotation; and a trigger connected with the valve, which during its movement under pressure greater than a predetermined pressure engages the projecting portion of the flexible member, which yields and permits the valve to pass thereby.

6. In a mechanism of the character described, the combination with a valve body; of a conical valve seat fixed therein; a valve plug within the valve body; a valve stem within the plug; a valve of yielding material connected with the stem which will expand and form an air tight joint with the wall against which the valve moves when the valve is against the conical valve seat and pressure is applied thereto; means for limiting the movement of the valve within the plug away from the conical valve seat; and means for stopping the movement of the valve within the plug at a point short of its full movement if the valve is actuated by a pressure less than a predetermined pressure.

7. In mechanism of the character described, the combination with a valve body having a bore; of a conical valve seat projecting into the bore of the valve body; a valve plug threaded within the valve body having a bore therein substantially concentric with the axis of the conical valve seat and a radial slot through one wall opening into said bore; a valve movably mounted within the bore of the plug and in one of its positions is seated upon the conical valve seat; a flexible stop finger connected with the valve plug and projecting through said slot into the path of a part associated with the valve, said valve being out of engagement with the flexible stop finger when the valve is seated and until it has moved a limited distance when it engages and maintains its contact with the finger until the pressure against the valve is increased sufficiently to cause the stop finger to yield and permit further movement of the valve; and spring means within the valve body that applies substantially constant pressure to the valve in one direction.

8. In mechanism of the character described, the combination with a valve body; of a valve therein; a spring for moving the valve toward its seat under a substantially constant pressure; means in the path of the valve for yieldingly limiting its movement after it has been moved off its seat against said constant pressure, which means holds said valve against further movement until an increased pressure is applied thereto that will permit the valve to continue its movement against the constant pressure means, said limiting means comprising a spring that is substantially parallel with and upon one side of the axis of the valve with a part thereon that projects into the path of the valve.

In testimony whereof, I have hereunto affixed my signature.

FRANK N. KELSEY.